US012399256B2

(12) United States Patent
Grosser et al.

(10) Patent No.: US 12,399,256 B2
(45) Date of Patent: Aug. 26, 2025

(54) IR-TRANSPARENT SENSOR AND CAMERA SYSTEM FOR MOTOR VEHICLES

(71) Applicant: Covestro Deutschland AG, Leverkusen (DE)

(72) Inventors: Ulrich Grosser, Kürten (DE); Alexander Meyer, Düsseldorf (DE); Thomas Pfingst, Tönisvorst (DE); Peter Capellen, Krefeld (DE); Rafael Oser, Krefeld (DE); Rainer Hagen, Leverkusen (DE); Tobias Sadler, Monheim Am Rhein (DE); Vincenzo Taravella, Curno (IT); Andrea Crotti, Curno (IT); Stefania Scotuzzi, Brembate di Sopra (IT)

(73) Assignee: Covestro Deutschland AG, Leverkusen (DE)

(*) Notice: Subject to any disclaimer, the term of this patent is extended or adjusted under 35 U.S.C. 154(b) by 1161 days.

(21) Appl. No.: 17/287,716

(22) PCT Filed: Oct. 11, 2019

(86) PCT No.: PCT/EP2019/077551
§ 371 (c)(1),
(2) Date: Apr. 22, 2021

(87) PCT Pub. No.: WO2020/083661
PCT Pub. Date: Apr. 30, 2020

(65) Prior Publication Data
US 2021/0382146 A1 Dec. 9, 2021

(30) Foreign Application Priority Data
Oct. 23, 2018 (IT) .......... 102018000009717

(51) Int. Cl.
*G01S 7/481* (2006.01)
*C08J 7/04* (2020.01)
*C08J 7/043* (2020.01)
*C08K 5/00* (2006.01)
*C08K 5/18* (2006.01)
*C08K 5/34* (2006.01)
*C08K 5/3417* (2006.01)
*C08K 5/3465* (2006.01)
*H04N 23/52* (2023.01)

(52) U.S. Cl.
CPC .......... *G01S 7/4813* (2013.01); *C08J 7/042* (2013.01); *C08J 7/0427* (2020.01); *C08J 7/043* (2020.01); *C08K 5/0091* (2013.01); *C08K 5/18* (2013.01); *C08K 5/3417* (2013.01); *C08K 5/3465* (2013.01); *H04N 23/52* (2023.01); *C08J 2369/00* (2013.01); *C08J 2483/04* (2013.01)

(58) Field of Classification Search
CPC ....... G01S 7/4813; C08J 7/0427; C08J 7/043; C08J 7/042; C08J 2369/00; C08J 2483/04; H04N 23/52; C08K 5/0091; C08K 5/18; C08K 5/3417; C08K 5/3465
USPC ........................................................ 524/526
See application file for complete search history.

(56) References Cited

U.S. PATENT DOCUMENTS

| 6,537,673 | B2 | 3/2003 | Sada et al. |
| 8,908,159 | B2 | 12/2014 | Mimeault |
| 9,845,412 | B2 | 12/2017 | Meyer et al. |
| 11,512,181 | B2 | 11/2022 | Grosser et al. |
| 2012/0081544 | A1 | 4/2012 | Wee |
| 2012/0287417 | A1* | 11/2012 | Mimeault ............... G01S 17/42 356/5.01 |
| 2015/0368434 | A1 | 12/2015 | Meyer et al. |

FOREIGN PATENT DOCUMENTS

| JP | 2002116318 A | 4/2002 |
| JP | 20089222 A | 1/2008 |
| JP | 2014517921 A | 7/2014 |
| JP | 2016507402 A | 3/2016 |
| JP | 2020519706 A | 7/2020 |
| WO | 2017127734 A1 | 7/2017 |
| WO | 2018051909 A1 | 3/2018 |

OTHER PUBLICATIONS

International Preliminary Report on Patentability received for PCT Patent Application No. PCT/EP2019/077551, mailed on May 6, 2021, 11 pages (7 pages of English Translation and 4 pages of Original Document).
International Search Report and Written Opinion received for PCT Patent Application No. PCT/EP2019/077551, mailed on Dec. 12, 2019, 13 pages (6 pages of English Translation and 7 pages of Original Document).

* cited by examiner

Primary Examiner — Ling Siu Cho
Assistant Examiner — Ronald Grinsted
(74) Attorney, Agent, or Firm — John E. Mrozinski, Jr.

(57) ABSTRACT

A sensor system comprises a LiDAR unit, a camera for visible light and a cover through which light arrives at the LiDAR unit and the camera. The cover comprises a layer containing dyes.
The light transmission of the cover in the range from 380 nm to 780 nm is 3% to 25% and in the range from 380 nm to 1100 nm is 40% or more. The attenuation of the LiDAR signal by the cover is such that at least 65% of the original signal intensity reaches the LiDAR detector.
The layer containing dyes contains a composition comprising i) at least 70% by weight of a transparent thermoplastic polymer, ii) at least one green and/or red dye and iii) at least one red and/or violet dye.
The product of the sum of the weight % fractions of dyes ii) and iii) and the thickness of the layer containing dyes is 0.041 to 0.12 wt % mm.
Finally, the composition contains 0% to 0.0005% by weight of IR absorbers.

15 Claims, No Drawings

IR-TRANSPARENT SENSOR AND CAMERA SYSTEM FOR MOTOR VEHICLES

CROSS-REFERENCE TO RELATED APPLICATIONS

This application is a national stage application (under 35 U.S.C. § 371) of PCT/EP2019/077551, filed Oct. 11, 2019, which claims benefit of Italian Application No. 102018000009717, filed Oct. 23, 2018, both of which are incorporated herein by reference in their entirety.

The present invention relates to a sensor system comprising: a LiDAR unit having a transmitter for laser light having a wavelength of 800 nm to 1600 nm and a receiver for light having a wavelength of 800 nm to 1600 nm; a camera for visible light having a wavelength of 380 nm to 780 nm and a cover arranged such that IR light transmitted from the LiDAR unit and received thereby and visible light received by the camera passes through the cover, wherein the cover comprises a layer comprising dyes. The invention likewise relates to a vehicle comprising such a sensor system.

Driver assistance systems such as emergency brake assistants, lane assistance systems, traffic sign recognition systems, adaptive speed control systems and distance controllers are known and are employed in current vehicles. To implement the recited functions, surroundings detection sensors generally based on radar, LiDAR, ultrasound and camera sensors are employed. Stereo-optical camera systems and LiDAR sensors are important in particular for highly automated and autonomous driving, since they are capable of providing high-resolution three-dimensional images of the vehicle surroundings at from close to distant range. The substrate materials described in the present invention are suitable in particular for optical camera systems such as mono and stereo camera systems and LiDAR sensors. The substrate materials are also suitable for radar sensors.

Optical camera systems are nowadays already employed in the field of vehicle sensors, for example for lane keeping assistants. A great advantage of optical sensors is that they can reproduce a very precise image of the environment, i.e. the environment is not detected point by point but rather large surface areas are imaged. If the distance, for example from an object or other vehicle located in front of the vehicle, is also to be determined, a plurality of cameras such as stereo cameras are employed instead of mono cameras. It is also possible to employ two or more LiDAR sensors instead of a rotating LiDAR system. Detecting at least two images makes it possible to calculate a three-dimensional image, for example by triangulation. Such a process thus also allows distance measurements. While systems for optical distance measurement are very precise, precision decreases with increasing distance from the particular object. When used as a sole sensor system, an optical camera system is dependent on the prevailing light conditions. Particular light conditions such as oncoming lights, strong sunlight, twilight or darkness can be severely detrimental to the measured result. Detecting objects showing little contrast or few contours can also be problematic. This can result in an erroneous interpretation of the environment.

A plurality of sensor systems are therefore employed. Accordingly, digital camera images may be compared with the information from other sensor systems such as radar and especially LiDAR sensors. The collated information allows the software to generate a very largely error-free image of the environment and correct any false readings from individual sensor systems. Generating such a precise image of the environment is indispensable for autonomous driving systems. A cover made of a thermoplastic material must therefore simultaneously be suitable for a plurality of sensor types and it is especially desirable for design reasons not to have to employ a plurality of materials but rather to be able to realize the particular cover from one material.

LiDAR (short for light detection and ranging) or else LaDAR (laser detection and ranging) is a method for optical distance and velocity measurement that is related to radar. Instead of radio waves or microwaves in the case of radar, it uses infrared laser beams. There are very different types of LiDAR systems, which differ inter alia in the horizontal detection range (e.g. 70° up to 360°), the type of laser (e.g. continuous-wave scanner laser or static pulsed laser) and the sensor technology (e.g. mechanically rotating mirror or semiconductor electronics). The present invention also covers infrared cameras related technically to LiDAR that use their own infrared light source.

Component parts based on thermoplastic material offer many advantages over conventional materials such as for example glass for use in the automotive sector. These include for example elevated fracture resistance and/or weight reduction which in the case of automobiles allow greater occupant safety in road traffic accidents and lower fuel consumption. Finally, materials containing thermoplastic polymers allow substantially greater design freedom on account of their easier mouldability.

Since thermoplastic materials are generally permeable to infrared (IR) radiation, these should in principle be suitable for such sensor systems. Surprisingly, as has been recognized in the context of the invention, however, most conventional thermoplastics employed in automotive exteriors are not suitable for such sensors. It was thus shown that even low wall thicknesses of less than 1 mm are sufficient for many thermoplastics to markedly reduce the signal strength of a LiDAR sensor such that they are unsuitable for such systems. These include for example polyolefins, polyamides, ABS, PC/ABS blends and further thermoplastic materials commonly employed in automotive exteriors.

Besides the substrate material itself, there are also other factors that contribute to attenuating the LiDAR sensor signal. Examples thereof include further component parts made from different materials and also protective/coating layers.

The purpose of a cover made from a thermoplastic material is to conceal the LiDAR sensor and the optical camera system and also to protect the sensitive sensor electronics.

It must also be ensured that the substrate material has a sufficient transmission in the visible spectral region from 380 to 780 nm since otherwise particularly under certain light conditions—for example in twilight—the optical camera system no longer operates reliably and the total light yield in CCD cameras is also severely reduced. To further complicate matters, the sensor cover shall not only protect the sensor system from dirt and weathering effects but shall also provide visual concealment for design reasons. The technical sensor system shall thus be discernible through the cover only in outline, if at all. This means that the transmission of the material must be chosen such that on the one hand it is see-through only to a very limited extent, if at all, while on the other hand the optical and IR-assisted sensor system must be able to operate without fault.

The prior art describes various thermoplastic systems which in principle exhibit a permeability to electromagnetic waves. Also described are thermoplastic compositions exhibiting a high colour/weathering stability.

EP 2652030 describes weathering-stable compositions which show only slight colour variation after weathering. However, such compositions are not suitable for use in combination with the recited sensor systems.

Stereo camera-based pedestrian recognition systems are described for example in Bergasa et al., Sensors (Basel, Switzerland) (2010), 10(4), 3741-58.

CN 105400189 A describes a laser beam-permeable opaque substrate material based on a polyurethane-polyester system. Special colourant combinations are recited which are suitable for these polyurethane-polyester-based systems and in principle are permeable to laser beams. Such compositions are suitable in particular for laser welding. Substrate materials based on polycarbonate are not described. Sensor-suitable substrate materials are likewise not described.

WO 2016/037865 A1 describes automotive exterior parts having a glasslike appearance. Substrate materials suitable for LiDAR systems are not described here.

WO 2008/12775 A1 describes radar sensors for automotive applications. However, these sensors operate in the range from 20-25 GHz and do not allow conclusions to be drawn about suitable substrate materials for laser-assisted systems in the IR region.

WO 2008/149093 A1 describes laminated and pigmented glass systems suitable inter alia for LiDAR sensors. A solution for polycarbonate-based substrate materials cannot be derived from this document.

US 2009/284603 A1 describes thermoplastic substrates which comprise colourants. These substrate materials are said to be highly permeable to IR radiation. Particular colourant mixtures are described. Whether these mixtures are suitable for laser-assisted detectors is not described. No specific colourant compositions for polycarbonate are described.

EP 1772667 A2 describes plastic component parts comprising concealed light elements. The plastic component part here conceals the light element but is transparent or semi-transparent to the relevant radiation. To achieve this, the substrate contains effect pigments. Such pigments are unsuitable for laser-assisted systems since they result in scattering.

JP 2003-004942 A describes multilayer articles consisting of various plies of materials having a differing refractive index. These systems are permeable to IR radiation. However, markedly higher demands are placed on materials for covers for laser-assisted IR sensors. No laser-assisted sensors are described.

US 2016/0291134 A1 reports on the use of LiDAR sensors in the automotive sector for autonomous/semiautonomous driving. This document does not elaborate on suitable substrate materials for covering or housing LiDAR sensors.

The prior art describes systems permeable to IR radiation and based on thermoplastic substrates. Such substrates are suitable for example for infrared cameras or for laser welding. However, no teaching for action arises therefrom since laser-assisted sensor systems operating in the IR range have a markedly elevated sensitivity. Thus the slightest scattering results in errors in the sensor system and thus makes corresponding substrate materials unusable.

Transparent covers made of thermoplastic material for optical camera systems are described for example in US 2016187764 and CN 103665410. These do not provide any teaching of how to proceed based on the stated object.

It is an object of the present invention to provide a sensor system having a LiDAR unit and an optical camera which elicits an aesthetically pleasing impression in the observer. It is a particular object of the present invention to provide such a sensor system in which the interior is hardly visible to an observer, if at all, but which is nevertheless fit for use.

The object is achieved in accordance with the invention by a sensor system according to claim 1 and a vehicle according to claim 15. Advantageous developments are specified in the subsidiary claims. They may be combined as desired unless the opposite is clear from the context.

The sensor system comprises:
  a LiDAR unit having a transmitter for laser light having a wavelength of 800 nm to 1600 nm and a receiver for light having a wavelength of 800 nm to 1600 nm;
  a camera for visible light having a wavelength of 380 nm to 780 nm and
  a cover arranged such that IR light transmitted by the LiDAR unit and received thereby and visible light received by the camera passes through the cover, wherein the cover comprises a layer containing dyes.

The cover has a light transmission Ty in the range from 380 to 780 nm of ≥3% to ≤25% determined according to DIN ISO 13468-2:2006 (D65, 10°) and a transmission for light in the range from 380 nm to 1100 nm of ≥40% determined according to DIN ISO 13468-2:2006 (analogously with this standard; aforementioned wavelength range used).

The cover moreover attenuates the LiDAR signal only to the extent that the signal intensity of the IR light transmitted by the LiDAR unit and re-received thereby (determined by reflection from a smooth surface painted with $TiO_2$-containing white paint at a distance of 3.2 m) is ≥65% of a reference intensity determined without the cover.

The layer containing dyes comprises a thermoplastic composition comprising the following components:
  i) at least 70 wt % based on the total weight of the composition of a transparent thermoplastic polymer;
  ii) at least one green and/or blue colourant;
  iii) at least one red and/or violet colourant;
  wherein the product of the sum of the weight percent fractions (based on the total weight of the composition) of the colourants ii) and iii) and the thickness of the layer containing dyes is ≥0.041 wt % mm to ≤0.12 wt % mm and wherein the composition contains 0 to ≤0.0005 wt % based on the total weight of the composition of infrared absorbers.

The inventive configuration of the layer containing dyes makes the cover appear dark to black to the observer and electronic elements such as sensors or cameras arranged therebehind are hardly perceived, if at all. This is known as the "black panel" effect and allows the automotive designer greater freedom in the design of aesthetically pleasing automotive exteriors.

The cover is preferably a moulding employed in the front or rear region of a vehicle, for example a bumper, radiator grille, front panel or a rear panel, in particular a front panel for a motor vehicle, but may likewise be a vehicle side element. However, the cover may likewise also be a roof or roof module for a motor vehicle.

The cover may equally be a moulding employed in the interior of a vehicle. The system according to the invention may then be used to discern control gestures made by occupants of a vehicle.

The cover may be produced by injection moulding. Furthermore, polycarbonate in particular also exhibits very good properties such as high heat resistance and high stiffness.

"System" is used here not only in the narrow sense of a package of mechanically joined individual parts, such as an apparatus, for instance, but also more broadly as a mere combination of individual parts (merely) joined in a functional sense to form a unit. The LiDAR sensor and the camera may be installed into the particular vehicle separately and the cover provided for a desired position in the vehicle through which the pulses of the LiDAR sensor and the light to be registered by the camera are intended to pass. However, a mechanically joined combination may likewise be concerned.

The LiDAR unit comprises a transmitter for laser light having a wavelength of 800 nm to 1600 nm. In accordance with the nature of laser light, this is not to be understood as meaning that the transmitter emits light having every wavelength between 800 nm and 1600 nm. On the contrary, it is sufficient when light of one wavelength, for example 905 nm, is emitted. It is also possible to employ a plurality of lasers having different wavelengths in the recited range.

The receiver is typically narrowbandedly matched to the emitted laser light, for example 903 nm or 905 nm. However, it is also possible for the receiver to be matched to a broader spectral window in the wavelength range of 800 nm to 1600 nm or narrowbandedly to a plurality of wavelengths.

The camera is a camera for visible light and records light in the wavelength range of 380 nm to 780 nm, wherein this wavelength range is not to be understood as being exhaustive. It is possible for this wavelength range to be broader, for example up to 800 nm, 900 nm, 1000 nm or 1100 nm. Cameras for visible light often have a preceding IR filter. If said filter is removed, several models can record images in the wavelength range of up to 1100 nm.

The camera is preferably a video camera in order to be able to provide the driver assistance system or autonomous driving system of the vehicle with information ideally in real time. The camera is more preferably a stereo camera.

The cover is arranged such that infrared light from and to the LiDAR unit and visible light to the camera passes through it. With its layer containing dyes it constitutes a partial filter for visible light and is ideally transparent to IR light. It further protects the LiDAR unit and the camera from shocks, soiling, etc. The distance between the cover and the LiDAR unit and/or the camera may be for example in the range from 1 cm to 20 cm.

A cover in the context of the invention may be a housing which completely or substantially completely—apart from cable ducts etc.—encompasses the LiDAR unit and the optical camera. Such a combination of housing and LiDAR unit and optical camera likewise forms part of the subject matter of the invention in addition to the superordinate system of the vehicle. It will be appreciated that all embodiments and configurations described as preferable also apply to this combination alone.

Likewise the cover may however also be only one element placed in front of the LiDAR sensor/the optical camera system in the direction of the vehicle outer skin, preferably as the vehicle outer skin. Such a cover is for example a front panel or a bumper, preferably a front panel. According to the invention, a front panel is to be understood as meaning a vehicle body part which as part of the outer shell is attached to the vehicle. This may be a formative constituent of the vehicle front or a design element attached to the front of the vehicle. A "front panel" is further to be understood as meaning for example a replacement for a radiator grille.

As a result of new forms of mobility, for example electromobility, a radiator grille consisting of a multiplicity of openings is no longer necessary. A front panel is therefore preferably a self-contained front cover or a body part which may comprise only occasional ventilation slots or retains a radiator grille appearance only for design reasons and combines various functions. Such a component part can be integrated seamlessly.

Covers according to the invention also include side panels, for example door elements, or rear panels, which allow covering of any required lateral sensors or sensors attached at the rear. In the case of a front panel, further functional elements such as screens, monitors, lights etc. may also be attached or integrated therebehind. These functions may for example contribute to improving pedestrian safety by projecting/displaying certain danger symbols on the front of the vehicle. If such functions are integrated, it is preferable when the front panel or the particular cover reproduces the monitor or illumination element therebehind in an ideally colour-neutral manner.

In order to generate a three-dimensional image of the environment, a plurality of images must be recorded by stereo cameras or LiDAR sensors. The sensors must have a certain distance from one another to allow calculation of the three-dimensional image obtained via LiDAR or the stereo-optical camera system. The cameras and/or LiDAR sensors can thus be mounted at the outer edges of the vehicle, for example in the region of the headlights. They may also be integrated into the headlight assembly itself. The headlight assembly may comprise the headlights themselves and also indicators and sensors.

Thus the light source may be covered by transparent polycarbonate and the sensor system and the camera by the cover according to the invention in order to conceal the sensor system and the camera. The production of such headlight covers may be effected for example by 2K injection moulding. The same is also possible for taillights. Integration into exterior mirrors is possible in similar fashion. The sensor system in the region of the windscreen or the A-, B-, or C-pillar may also be possible. It is also possible to use films that are LiDAR-transparent and camera-compatible, i.e. made of the composition described according to the invention or derivable therefrom, for covering the sensor system. Such films may be used in film-insert moulding to confer appropriate shapes. The material used in this film-insert moulding must be sensor-compatible, i.e. it must bring about only limited attenuation of the sensor signal, if any.

According to the invention it is provided that the cover has a light transmission Ty in the range from 380 to 780 nm of ≥3% to ≤25% determined according to DIN ISO 13468-2:2006 (D65, 10°). For higher transmissions it was found that the desired "black panel" effect is no longer adequately achieved and for lower transmissions too little light arrives at the camera for visible light to provide evaluable image information.

It is further provided that the cover has a transmission for light in the range of 380 nm to 1100 nm of ≥40% determined according to DIN ISO 13468-2:2006 (analogously with this standard; aforementioned wavelength range used). Lower transmissions limit the range of the LiDAR system and the camera excessively.

The specified transmissions are to be understood as meaning average transmissions (arithmetic average) averaged over all wavelengths in the relevant range.

The cover attenuates the LiDAR signal only to the extent that the signal intensity of the IR light transmitted by the LiDAR unit and re-received thereby (determined by reflection from a smooth surface painted with $TiO_2$-containing white paint at a distance of 3.2 m) is ≥65% of a reference intensity determined without the cover. Higher attenuations corresponding to signal intensities below 65% of the reference intensity likewise reduce the range of the LiDAR system.

The layer containing dyes contains a transparent thermoplastic polymer. In the context of the present invention, "transparent" is to be understood as meaning that the plastic has a light transmission (based on ASTM 1003 or ISO 13468; specified in % and illuminant D65/100) of at least 6%, more preferably of at least 12%, and particularly preferably of at least 23%. Haze (ASTM D1003: 2013) is moreover preferably less than 3%, more preferably less than 2.5%, and particularly preferably less than 2.0%.

Examples of suitable thermoplastics are polyarbonate, copolycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), polyamide, cyclic polyolefin, poly- or copolyacrylates and poly- or copolymethacrylate, for example poly- or copolymethylmethacrylates (such as PMMA) and also copolymers with styrene, for example transparent polystyrene-acrylonitrile (PSAN), thermoplastic polyurethanes, polymers based on cyclic olefins (e.g. TOPAS®, a commercial product from Ticona).

Preference is given to polycarbonate, copolycarbonate, polyestercarbonate, aromatic polyesters or polymethylmethacrylate or mixtures of the recited components. Polycarbonate and copolycarbonate are particularly preferred. Thus the polycarbonate may be an aromatic polycarbonate having a melt volume rate MVR of 8 to 20 cm$^3$/(10 min) determined according to ISO 1133-1:2012-03 (300° C., 1.2 kg).

Aromatic polycarbonates particularly preferred according to the invention as component i) preferably have weight-average molecular weights Mw of 22 000 to 29 000 g/mol, though in principle weight-average molecular weights Mw of 10 000 to 50 000 g/mol, more preferably of 14 000 to 40 000 g/mol, particularly preferably of 16 000 to 32 000 g/mol would also be suitable. The values Mw are determined by gel permeation chromatography calibrated against bisphenol A polycarbonate standards using dichloromethane as eluent. The polycarbonates are preferably prepared by reactions of bisphenol compounds with carbonic acid compounds, especially phosgene, or with diphenyl carbonate or dimethyl carbonate in the melt transesterification process.

Particular preference is given here to homopolycarbonates based on bisphenol A and copolycarbonates based on the monomers bisphenol A and 1,1-bis(4-hydroxyphenyl)-3,3,5-trimethylcyclohexane, for example Apec® from Covestro Deutschland AG.

The composition of the layer containing dyes may further contain customary additives such as flame retardants, antistats, UV absorbers, stabilizers, antioxidants and demoulding agents. Suitable ultraviolet absorbers are benzotriazoles, triazines, benzophenones and/or arylated cyanoacrylates. Preferred stabilizers include phosphites and phosphonites and also phosphines. Also employable are alkyl phosphates, for example mono-, di- and trihexyl phosphate, triisooctyl phosphate and trinonylphosphate. Employable antioxidants include phenolic antioxidants such as alkylated monophenols, alkylated thioalkylphenols, hydroquinones and alkylated hydroquinones. Suitable demoulding agents are for example those based on a fatty acid ester, preferably based on a stearic ester, especially preferably based on pentaerythritol. It is preferable to employ pentaerythritol tetrastearate (PETS) and/or glycerol monostearate (GMS).

The composition particularly preferably contains less than 0.1 wt % of, and very particularly preferably the compositions of the substrate layer are free from, scattering additives, for example those based on acrylate, polyethylene, polypropylene, polystyrene, glass, aluminium oxide and/or silicon dioxide. Furthermore the composition particularly preferably contains less than 0.1 wt % of, and very particularly preferably is free from, white pigments or similar pigments such as, for example, titanium dioxide, kaolin, barium sulfate, zinc sulfide, aluminium oxide, aluminium hydroxide, quartz flour, from interference pigments and/or pearlescent pigments, i.e. platelet-shaped particles such as mica, graphite, talc, SiO2, chalk and/or titanium dioxide, coated and/or uncoated.

Furthermore the composition particularly preferably contains less than 0.1 wt % of, and very particularly preferably the composition is free from, nanoparticulate systems such as metal particles, metal oxide particles. The composition preferably also contains less than 0.1 wt % of, particularly preferably is free from, pigments based on insoluble pigments, such as are described for example in DE 10057165 A1 and in WO 2007/135032 A2.

It is further provided that the composition contains 0 to ≤0.0005 wt % based on the total weight of the composition of infrared absorbers. It is preferable when the composition is free from infrared absorbers. This is related to the attenuation of the LiDAR signal by infrared absorbers in the polymer. Infrared absorbers are in particular carbon black, LaB$_6$ and molecules having a quaterylene structure.

The cover comprises a layer containing dyes, wherein the dyes are at least one green and/or blue colourant ii) and at least one red and/or violet colourant iii). Also included in accordance with the invention is the case where one layer contains the polycarbonate i) and the colourant ii) but not the colourant iii) and a further layer contains the polycarbonate i) and the colourant iii) but not the colourant ii). These two layers are together regarded as the layer containing dyes. However, preference is given to the case where ii) and iii) are present in a common polymer matrix i).

The dyes ii) and iii) are preferably dyes which exhibit a low absorption, if any, in the infrared range and in particular in the wavelength range of the LiDAR laser(s).

In order that the light transmissions in the range of visible light (380 nm to 780 nm) specified according to the invention are achieved for the cover, it is the case for the colourants ii) and iii) of the layer containing dyes that the product of the sum of the wt % fractions of ii) and iii) and the thickness of the layer containing dyes is ≥0.041 wt % mm to ≤0.12 wt % mm (preferably ≤0.11 wt % mm, more preferably ≤0.10 wt % mm). Thus in a thinner layer the dye content may be made higher and in a thicker layer the dye content may be made lower.

The system may be mounted not only on motor vehicles but also on other means of transport and means of locomotion, such as drones, aeroplanes, helicopters or rail vehicles, which in accordance with the invention are all subsumed within the term "vehicles". Also included are (semi)autonomous machines which are not necessarily used for locomotion, such as robots, harvesters and the like.

In one embodiment the component ii) is selected from the formulae (1), (2a-c), (3), (4a), (4b), (5), (6), (7) and/or (8) and the component iii) is selected from the formulae (9), (10), (11), (12), (13), (14a), (14b) and/or (15):

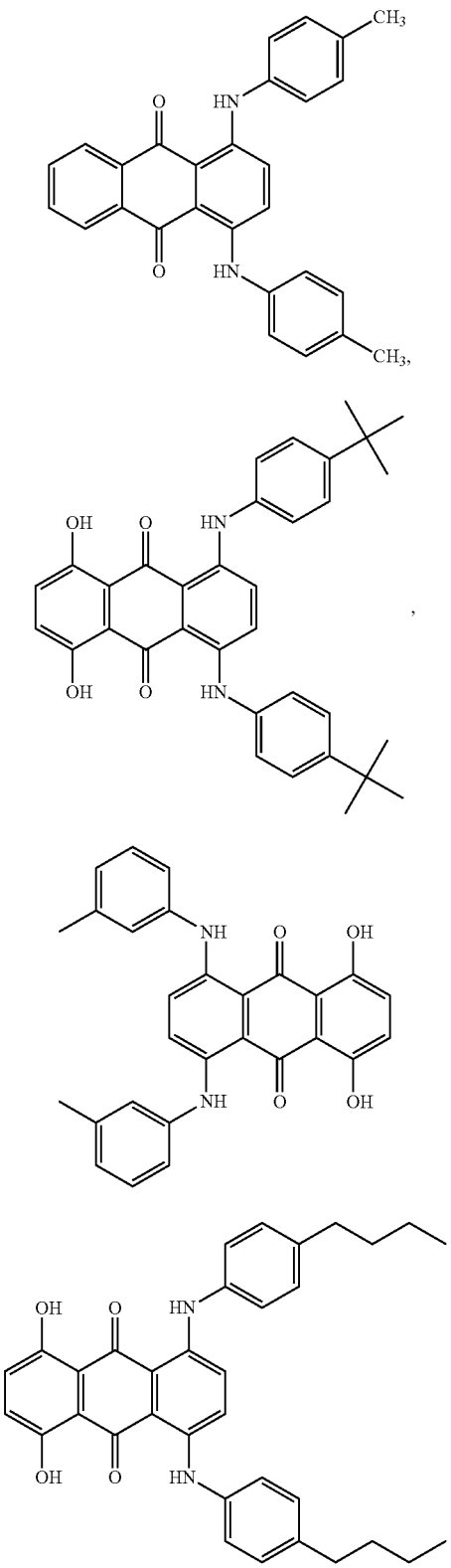

The colourant of formula (1) is known under the name Macrolex Green 5B from Lanxess Deutschland GmbH, Colour Index number 61565, CAS Number: 128-90-3, and is an anthraquinone dye.

Colourants of formulae (2a), (2b) and (2c) are known inter alia under the name Macrolex Green G (Solvent Green 28).

Blue colourants employed according to this embodiment are colourants of formulae (3) and/or (4a/4b) and/or (5a/5b):

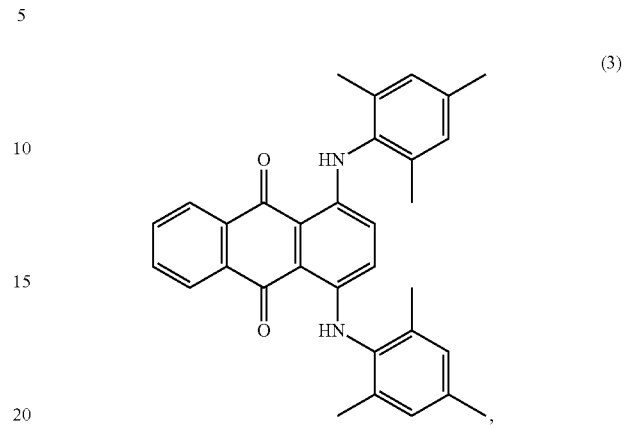

obtainable under the name "Keyplast Blue KR", CAS number 116-75-6,

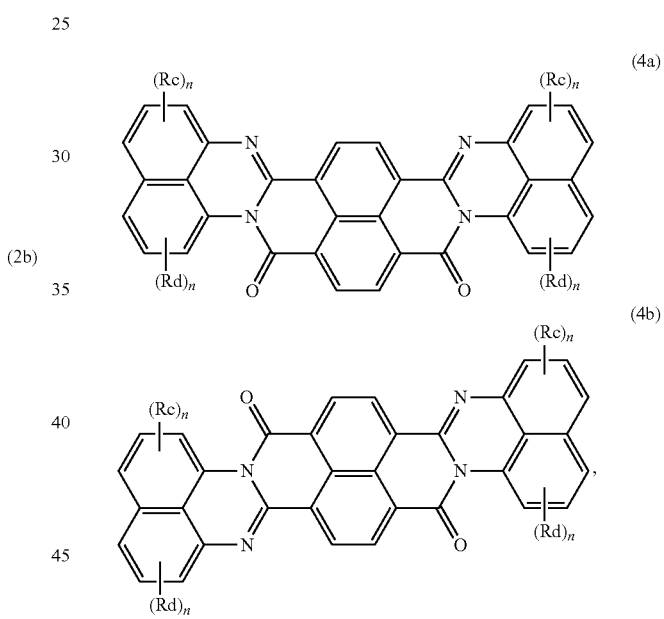

wherein
Rc and Rd independently of one another are a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl,
n independently of the respective R represents a natural number between 0 and 3, wherein the radical for n=0 is hydrogen.

In a preferred embodiment Rc and/or Rd are Cl and are in o- and/or p-positions relative to the carbon atoms bearing the amine functionalities, for example di-orthochloronaphthalino, di-ortho, mono-para-chloronaphthalino and mono-ortho-naphthalino. Furthermore in a preferred embodiment Rc and Rd each represent a tert-butyl radical which is preferably in the meta-position relative to the carbon atoms bearing the nitrogen functionalities.

In a particularly preferred embodiment n=0 in all rings, so that all Rc and Rd=H.

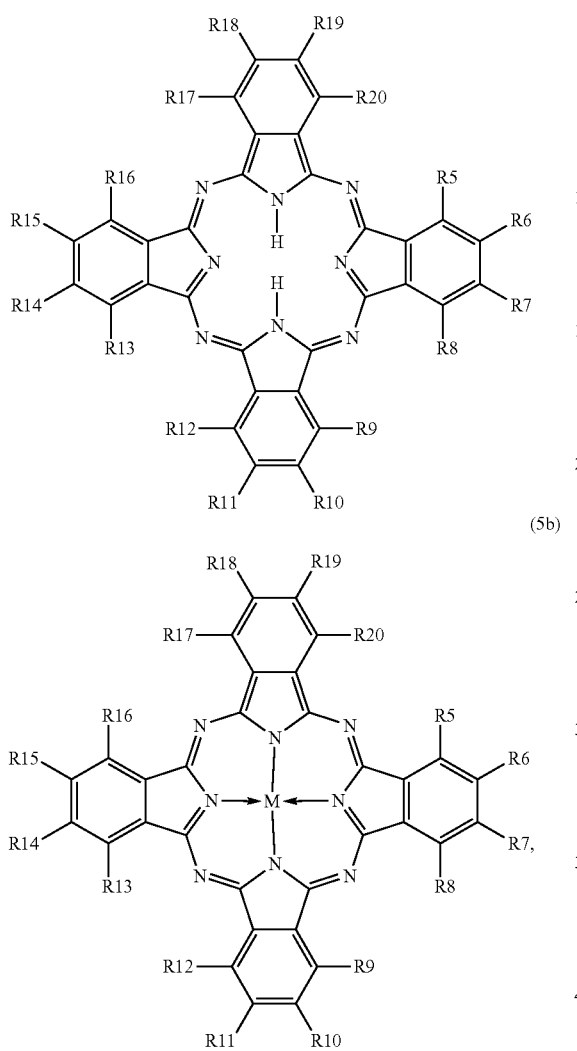

(5a)

(5b)

The radicals R(5-20) are in each case independently of one another hydrogen, methyl, ethyl, propyl, isopropyl, butyl, isobutyl, tert-butyl, pentyl, neopentyl, hexyl, thexyl, fluorine, chlorine, bromine, sulfone, CN.

Preferably, R(5-20) is the same in all positions. More preferably R(5-20) is H in all positions. In an alternative embodiment R(5-20) is Cl in all positions.

M is preferably aluminium (with R=H: Aluminium phthalocyanine, CAS: 14154-42-8), nickel (with R=H: Nickel phthalocyanine, CAS: 14055-02-8), cobalt (with R=H: Cobalt phthalocyanine, CAS: 3317-67-7), iron (with R=H: Iron phthalocyanine, CAS: 132-16-1), zinc (with R=H: Zinc phthalocyanine, CAS: 14320-04-08), copper (with R=H: Copper phthalocyanine, CAS: 147-14-8; with R=H and Cl: Polychlorocopper phthalocyanine, CAS: 1328-53-6; with R=Cl: Hexadecachlorophthalocyanine, CAS: 28888-81-5; with R=Br: Hexadecabromophthalocyanine, CAS: 28746-04-5), manganese (with R=H: Manganese phthalocyanine, CAS: 14325-24-7).

The combination of M=Cu and R=H for all positions is especially preferred. For instance, a compound of structure (5b) with M=Cu and R(5-20)=H is obtainable as Heliogen® Blue K 6911D or Heliogen® Blue K 7104 LW from BASF AG, Ludwigshafen.

Compounds of structure (5a) are available, for example, as Heliogen® Blue L 7460 from BASF AG, Ludwigshafen. Further usable blue colourants include:
Colourants of formula (6) obtainable under the name "Macrolex Blue 3R Gran"

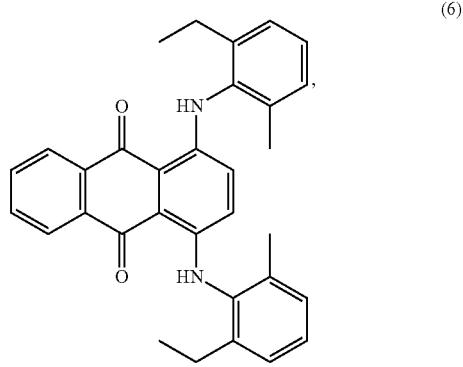 [SMILES: CCc1cccc(C)c1Nc1ccc(Nc2c(C)cccc2CC)c2c1C(=O)c1ccccc1C2=O]

(6)

and/or colourants of formula (7) obtainable under the name "Macrolex Blue RR" (CAS 32724-62-2; Solvent Blue 97; C.I. 615290),

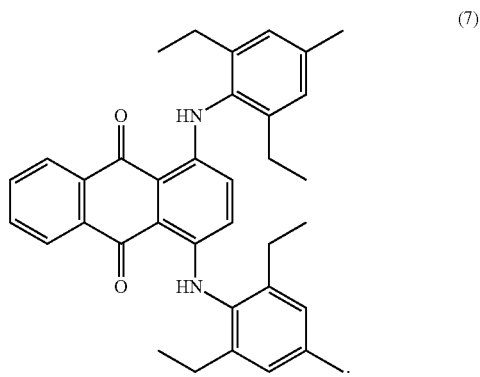 [SMILES: CCc1cc(C)cc(CC)c1Nc1ccc(Nc2c(CC)cc(C)cc2CC)c2c1C(=O)c1ccccc1C2=O]

(7)

Also employable as blue colourants are:

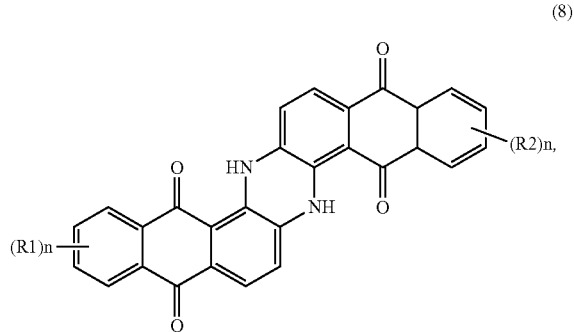

(8)

wherein
R1 and R2 are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl,
n is a natural number between 0 and 4.

In a particularly preferred embodiment, n=0 in all rings, and so all R1 and R2=H.

Colourants of this structure (8) are commercially available under the Paliogen Blue series from BASF AG.

When using colourants of structure (8) preference is given especially to pigments having a bulk volume (determined according to DIN ISO 787-11:1995-10) of 2 l/kg-10 l/kg, preferably 3 l/kg-8l/kg, a specific surface area (determined according to DIN 66132:1975-07) of 5 m²/g-60 m²/g, preferably 10 m²/g-55 m²/g, and a pH (determined according to DIN ISO 787-9) of 4-9.

Preferably employed as red colourant is a colourant of formula (9) obtainable under the name "Macrolex Red 5B" having CAS Number 81-39-0:

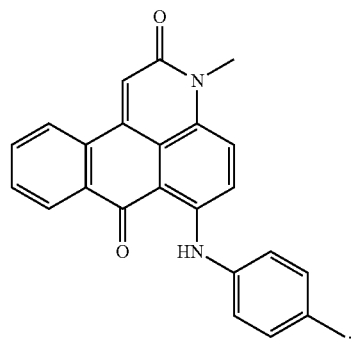
(9)

Also employable are colourants of formulae (10) having CAS Number 20749-68-2 (also: 71902-17-5) and (11) having CAS Number 89106-94-5:

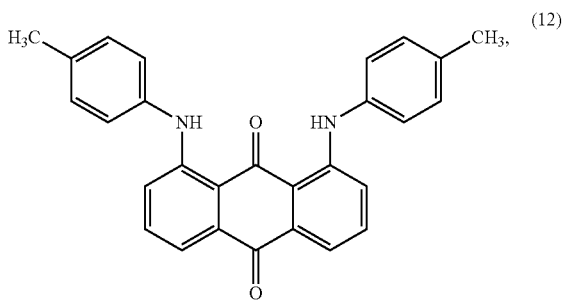

Preferably employed as violet colourants are colourants of formulae (12) having CAS Number 61951-89-1, (13) obtainable under the name "Macrolex Violet B" from Lanxess AG having CAS Number 81-48-1 or (14a/14b):

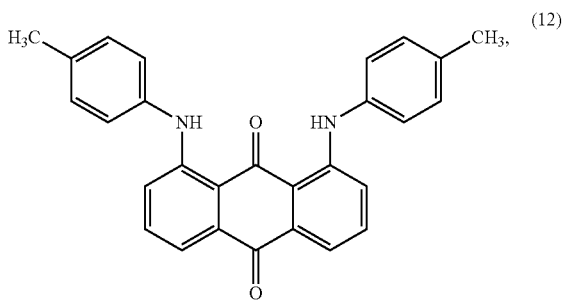

wherein R is selected from the group consisting of H and p-methylphenylamine radical;
preferably R=H;

wherein
Ra and Rb are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl,
n independently of the respective R represents a natural number between 0 and 3, wherein the radical for n=0 is hydrogen.

In a preferred embodiment Ra and/or Rb are Cl and are in o- and/or p-positions relative to the carbon atoms bearing the amine functionalities, for example di-orthochloronaphthalino, di-ortho, mono-para-chloronaphthalino and mono-ortho-naphthalino. Furthermore in a preferred embodiment Ra and Rb each represent a tert-butyl radical which is preferably in the meta-position relative to the carbon atoms bearing the nitrogen functionalities.

In a particularly preferred embodiment n=0 in all rings, so that all Ra and Rb=H.

Also employable are colourants conforming to formula (15) obtainable under the name "Macrolex RedViolet R", CAS Number 6408-72-6:

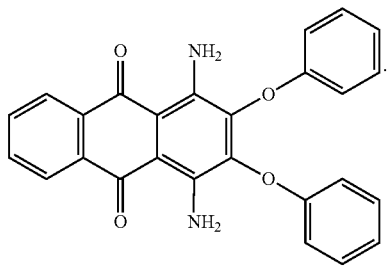

(15)

In a further embodiment the thermoplastic composition of the layer containing dyes comprises the following components:
- at least 99 wt % based on the total weight of the composition of aromatic polycarbonate having a melt volume rate MVR of 15 to 20 cm³/(10 min) determined according to ISO 1133-1:2012-03 (300° C., 1.2 kg);
- colourants of formula (2a), (2b) and/or (2c);
- colourants of formula (5b) where M=Cu and R(5-20)=H;
- colourants of formula (10);

wherein the sum of the colourants employed in total is ≥0.017 wt % to ≤0.057 wt % based on the total weight of the composition.

In a further embodiment the thermoplastic composition of the layer containing dyes comprises a yellow and/or orange-coloured dye of formulae (16), (17), (18), (19), (20) or a mixture of at least two thereof:

Employed as yellow colourants are colourants of formulae (16) obtainable under the name "Macrolex Yellow 3G" having CAS Number 4702-90-3 and/or (17) obtainable under the name "Macrolex Orange 3G" (CAS Number 6925-69-5, C.I. 564100):

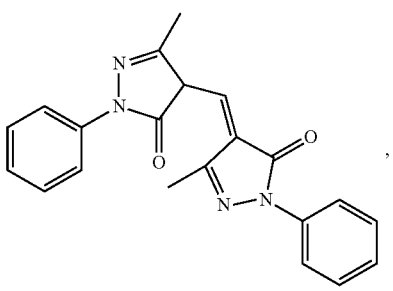

(16)

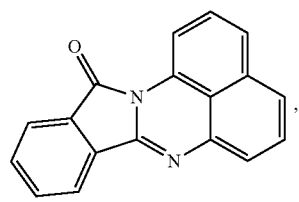

(17)

It is also possible to employ colourants of formulae (18) obtainable under the name "Oracet Yellow 180" having CAS Number 13676-91-0, (19) having CAS Number 30125-47-4 and/or (20) obtainable under the name "Oracet Orange 220; Solvent Orange 116" having CAS Number 669005-94-1.

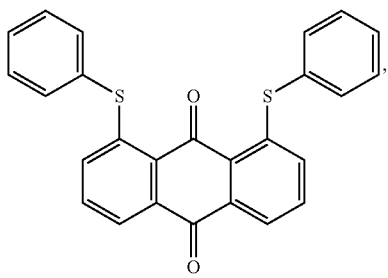

(18)

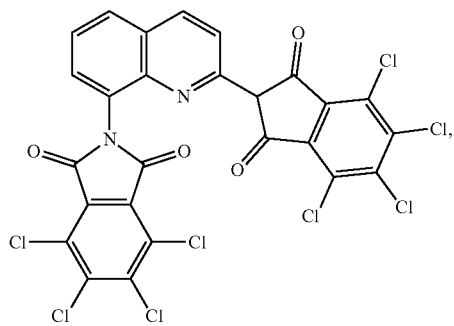

(19)

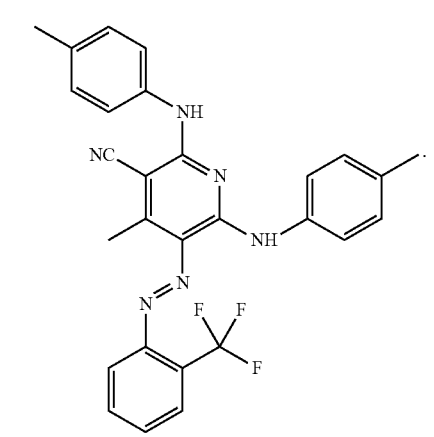

(20)

However, in principle further colourants may optionally also be employed in addition to the above-described colourants. Those preferred are Heliogen Green varieties (for example Heliogen Green K 8730; CAS 1328-53-6; Pigment Green 7; C.I. 74260).

Especially preferred are Green G (2a, b, c), Heliogen Green and Heliogen Blue (5a, 5b), Paliogen blue (8) in the one group and Macrolex Red EG (10) and Amaplast Violet PK (14a, 14b) and M Violet B (13) in the other group in combination with yellow colourants.

Exemplary colourant combinations are specified hereinbelow, wherein the reported wt % values are based on the total weight of the layer containing dyes and may deviate by ±10% of the reported value:
- Macrolex Violet 3R (12) and Macrolex Green 5B (1), 0.1 wt % of each of these colourants;
- Macrolex Red EG (10) 0.004 wt %, Macrolex Violet 3R (12) 0.001 wt % and Heliogen Blue K6911 [(5b) where M=Cu and R(5-20)=H] 0.0024 wt %;

Oracet Yellow 180 (18) 0.0004 wt %, Macrolex Red EG (10) 0.0045 wt % and Macrolex Green 5B (1) 0.0046 wt %;

Macrolex Red EG (10) 0.0007 wt %, colourants of structure (14a) and/or (14b) 0.0014 wt % and Paliogen Blue L6385 (8) 0.0030 wt %;

Colourants of structure (11) 0.0015 wt %, Macrolex Violet B (13) 0.0012 wt % and Heliogen Blue K6911 [(5b) where M=Cu and R(5-20)=H] 0.0010 wt % and 0.0018 wt %, Macrolex Blue RR (7) 0.0032 wt % and Macrolex Red EG (10) 0.0031 wt %.

In a further embodiment the camera has a limited infrared filter, if any. This allows the detection range of the camera to be extended from visible light into the IR range.

In a further embodiment the cover further comprises a topcoat layer. This can be used to improve scratch and weathering resistance. Coating systems particularly suitable therefor and used for example for polycarbonate sheets in the construction sector, for headlight covers made of polycarbonate or else in the field of polycarbonate automotive glazing may be roughly divided into three categories:

(a) thermosetting coating systems based on a polysiloxane coating which may be either single-layer or multilayer systems (with a merely adhesion-promoting primer layer between the substrate and the polysiloxane topcoat). They are described inter alia in U.S. Pat. Nos. 4,278,804, 4,373,061, 4,410,594, 5,041,313 and EPA 1 087 001. One variant is the use of the adhesive primer necessary for the siloxane-based topcoat as a UV protection primer when said primer is mixed with a UV absorber and applied in a higher layer thickness.

(b) thermally curable multilayer systems comprising a UV protection primer and a topcoat based on a polysiloxane coating. Suitable systems are known for example from U.S. Pat. Nos. 5,391,795 and 5,679,820.

(c) UV-curable coating systems, based on acrylate, urethane acrylate or acryloylsilane for example and optionally including fillers for improving scratch resistance, may provide sufficient protection from weathering on account of their relatively broad application layer thickness window. Such systems are known and inter alia described in U.S. Pat. No. 3,707,397 or DE 69 71 7959, U.S. Pat. Nos. 5,990,188, 5,817,715, 5,712,325 and WO 2014/100300.

In a further embodiment the topcoat layer contains an organomodified silane or a reaction product thereof. In a further embodiment an adhesion promoter layer (primer layer) is present between the topcoat layer and the layer containing dyes. Preference is given to a combination of an adhesion promoting UV protection primer based on polymethyl methacrylate comprising dibenzoyl resorcinol as a UV absorber and a polysiloxane topcoat comprising a silylated UV absorber. Both layers, i.e. the primer and the topcoat, together assume the UV protection function.

In a further embodiment the topcoat used in the topcoat layer is a UV-curable topcoat, such as has already been described under point c).

In a further embodiment a further layer is present on the side of the layer containing dyes that is opposite the topcoat layer. This further layer faces the LiDAR system and the camera and it may also be a topcoat layer. However, it is preferable when the further layer is an antireflection layer, an anti-condensation layer, an anti-dust layer, a layer improving media resistance or a layer improving scratch resistance or a combination thereof.

Examples of anti-condensation and anti-dust layers are layers obtained by flame silicatization. Anti-reflection layers include all single-ply or multi-ply layer constructions having as their outer layer a layer of low refractive index (nD<1.5). Use of the coating used on the outside can also improve inter alia the properties of media resistance, scratch resistance, reflection reduction (antireflection) and a slight anti-dust effect.

In a further embodiment in the cover the layer containing dyes has a thickness of ≥0.15 mm to ≤5 mm. The greatest thickness of the layer in the region of LiDAR laser passage is considered here.

In a further embodiment the cover comprises a plurality of layers containing dyes which may be identical or different. These layers may contain not only colourants of groups ii) and iii) but also further colourants.

In a further embodiment the cover further comprises a layer of an aromatic polycarbonate which does not contain green, blue, red and/or violet colourants. This layer is preferably transparent. It can therefore act as a carrier layer for a coloured film. Such composites are obtainable by employing the coloured film in film-insert moulding processes.

The invention likewise relates to a vehicle comprising a system according to the invention.

EXAMPLES

The present invention is elucidated in detail by the examples which follow, but without being limited thereto.
Materials Used PC1: Linear bisphenol A polycarbonate comprising end groups based on 4-butylphenol having an MVR of 19 $cm^3/(10\ min)$ measured at 300° C. and a loading of 1.2 kg according to ISO 1033 and containing 0.40% by weight of pentaerythritol tetrastearate as a demoulding agent.

A: Macrolex Green G: Solvent Green 28; CAS Number 4851-50-7 from Lanxess AG, Leverkusen. Conforms to formulae (2a), (2b) or (2c).

B: Heliogen Blue K7104: Pigment Blue 15:4; CAS Number 147-14-8 from BASF SE, Ludwigshafen. Conforms to structure (5b) where M=Cu and R(5-20)=H.

C: Macrolex Yellow 3G: Solvent Yellow 93; CAS Number 4702-90-3 from Lanxess AG, Leverkusen. Conforms to structure (16).

D: Macrolex Red EG: Solvent Red 135; CAS Number 20749-68-2 from Lanxess AG, Leverkusen. Conforms to structure (10).

PC2: Composition containing 99.8% by weight of polycarbonate from Covestro Deutschland AG having an MVR of about 12 $cm^3/10\ min$ measured at 300° C. and a loading of 1.2 kg (according to ISO 1133-1:2012-03) and based on bisphenol A and terminated with phenol and containing 0.1% by weight of Macrolex Violet 3R (conforms to structure (12)) and 0.1% by weight of Macrolex Green 5B (conforms to structure (1)).

PC3: Polycarbonate from Covestro Deutschland AG having an MVR of about 12 $cm^3/10\ min$ measured at 300° C. and a loading of 1.2 kg (according to ISO 1133-1:2012-03) and based on bisphenol A and terminated with phenol and containing UV absorbers and demoulding agents; the colourant content was <0.0002% by weight.

PC4: Polycarbonate from Covestro Deutschland AG having an MVR of about 12 $cm^3/10\ min$ measured at 300° C. and a loading of 1.2 kg (according to ISO 1133-1:2012-03) and based on bisphenol A and terminated with phenol and containing UV absorbers and demoulding agents; the colourant content was <0.0002% by weight.

SHP 470 FT 2050 (primer)/AS 4700 F (topcoat): Silicone-based scratch resistant coating from Momentive Performance Materials, USA. The use of primer and topcoat was carried out according to manufacturer's instructions. If the following examples refer to the AS 4700 F coating, this was always employed together with this primer.

Employed LiDAR Sensor

A Velodyne Ty Puck VLP 16 LiDAR sensor was employed. Said sensor operates in the wavelength range from 895 to 915 nm (tolerance range). The nominal wavelength, i.e. actual operating wavelength, of the 16 lasers is 903 nm.

The essential characteristics of this sensor include:

Vertical detection angle −15° to +15° with 2° spacing between scanning planes; horizontal detection angle 360°. The software includes a multibeam function with 16 beams for minimizing shadow effects. Horizontal resolution of the laser system is 0.1° to 0.4° depending on rotational velocity. The rotational velocity of vertical detection is adjustable between 5 to 20 Hz. At a data rate of 2 Mbyte/sec, 300 000 points/second are detected. The measurement accuracy achieved is about +/−3 cm, corresponding to 1 sigma. The detectable measuring distance is between 1 mm to 100 metres. The energy requirement of the sensor system is 8 watts of electrical power, corresponding to 0.7 A at 12 volts. The overall dimensions of the sensor are: diameter 100 mm and height 65 mm.

Method of Measurement

To reduce the scattered-light signals, the sensor head of the LiDAR sensor was shielded on the side away from the measurement path. Only lasers 1, 3, 5, 7, 8, 10, 12 and 14 were used. Furthermore, the field of view (FOV) of the sensor in the sensor interface was limited to 20° (350°-10°. The reflection surface used was a smooth white surface coated with $TiO_2$-containing paint. The wall was at a distance of 3.2 m from the LiDAR sensor.

The test specimens were tested using a sample holder parallel to the LiDAR, wherein the back side of the sample was arranged about 15 mm in front of the LiDAR sensor so that both the output signal and the reflected input signal had to pass through the wall thickness of the test sheet. Evaluation was performed using "VeloView" software from Velodyne, the manufacturer of the LiDAR sensor. The average value of the intensities measured for a sample was determined. This average sample value was divided by the average value of the reference measurement (air) to determine the relative intensity.

The measured intensities of the re-recorded laser signal were between 0% and 100%. The lower the attenuation (weakening) of the signal, i.e. the higher the intensity of the signal measured, the more suitable the cover for LiDAR-assisted sensor applications in the automotive sector. The intensities measured in the examples are documented in the column "LiDAR signal based on air value in %".

The permeability of the respective sheet to IR radiation in the range from 800 to 1600 nm was determined according to DIN ISO 13468-2:2006. The light transmission in the VIS region of the spectrum (380 to 780 nm, transmission coefficient Ty) was determined according to DIN ISO 13468-2: 2006 (D65,10°). The transmission measurements were carried out using a Lambda 950 spectrophotometer from Perkin Elmer with a photometer sphere.

To determine a "black panel effect" a camera objective was placed on a raisable platform in a box darkened with velvet. The open side of the box was taped shut with cardboard. An opening was then cut into the cardboard so that the camera objective was visible and the mouldings could be placed in front of the opening.

Whether or not a sensor apparatus located behind the moulding is discernible in daylight was specified as the criterion for success. Settings: Exposure 1/10s, shutter F/4, ISO 400. For the mouldings according to the invention this is the case only in outline, if at all. The results are recorded in the "black panel" column. The abbreviations are ++(good), +(relatively good), 0 (in outline) and − (not discernible).

To evaluate the fitness for purpose of a camera for visible light, a Canon EOS 600D with the EFS 18-55 mm standard zoom objective was used. The settings for the objective were: Exposure 1/25s, shutter f 8.0 and ISO 400.

Measurement was performed in a measuring room with incident sunlight. The camera and the object were in shade so that only diffuse light was present in the measuring region. A Pantec LM-20 Digital Luxmeter recorded readings of about 2800 lux in front of the object and about 700 lux in front of the lens. Specified as the criterion for success here was whether a test object could still be seen with the camera through the moulding. For the mouldings according to the invention the results were good or adequate. The results are recorded in the "dark/dark" column. The abbreviations are ++(good), 0 (adequate) and − (not discernible).

The reported thicknesses of the mouldings investigated did not account for any coatings due to their low thickness.

The formulations for the employed mouldings 1 to 8 were as follows:

| | PC1 wt % | A wt % | B wt % | C wt % | D wt % |
|---|---|---|---|---|---|
| moulding 3 | 99.98427 | 0.0008 | 0.004 | 0.00063 | 0.0103 |
| moulding 1 | 99.98164 | 0.00093 | 0.0047 | 0.00073 | 0.012 |
| moulding 2 | 99.9762 | 0.0012 | 0.0061 | 0.0009 | 0.0156 |
| moulding 4 | 99.97433 | 0.0013 | 0.0066 | 0.00097 | 0.0168 |
| moulding 5 | 99.9721 | 0.0014 | 0.0072 | 0.001 | 0.0183 |
| moulding 6 | 99.9643 | 0.0018 | 0.0092 | 0.0013 | 0.0234 |
| moulding 7 | 99.958 | 0.0021 | 0.0108 | 0.0015 | 0.0276 |
| moulding 8 | 99.9435 | 0.0028 | 0.0146 | 0.002 | 0.0371 |

| | Sum of A + B + D wt % | Sum of A + B + D * 2.3 mm wt % mm | Sum of A + B + D * 2.5 mm wt % mm |
|---|---|---|---|
| moulding 3 | 0.0151 | 0.03473 | 0.036179 |
| moulding 1 | 0.01763 | 0.040549 | 0.042228 |
| moulding 2 | 0.0229 | 0.05267 | 0.05474 |
| moulding 4 | 0.0247 | 0.05681 | 0.059041 |
| moulding 5 | 0.0269 | 0.06187 | 0.06417 |
| moulding 6 | 0.0344 | 0.07912 | 0.08211 |
| moulding 7 | 0.0405 | 0.09315 | 0.0966 |
| moulding 8 | 0.0545 | 0.12535 | 0.12995 |

For the material PC2 the sum of violet and green dyes is 0.2 wt %. A layer thickness of 0.1 mm equates to 0.02 wt % mm, a layer thickness of 0.175 mm to 0.035 wt % mm and a layer thickness of 0.5 mm to 0.1 wt % mm.

The examples of example group 1 investigated individual coloured polycarbonate mouldings in uncoated ("1K") form and coated with AS 4700 F ("1K-B"). The terms "LiDAR-side component" and "road-side component" specify the orientation of the mouldings investigated, i.e. whether they are facing the LiDAR sensor or facing outwards which during use of the system in a vehicle would be facing the road. The examples of example group 1 relate to one-component constructions containing no further mouldings. Thus nothing is recorded in the "road-side component" column.

In examples nos. 1 to 8 lower LiDAR signals than expected were observed on account of light scattering at the surfaces of the sample sheets, thus preventing any useful information from being obtained. The column "LiDAR signal based on air value in %" thus does not contain any measured values.

In the examples of example group 2 a two-component construction for the cover was investigated. The coloured mouldings were in each case oriented towards the LiDAR side. In examples nos. 19 to 23 the mouldings were covered with a 3.2 mm-thick layer of the transparent polycarbonate PC3 on its side facing outwards which during use of the system in a motor vehicle would be facing the road. In examples nos. 24 to 26 two identical mouldings were joined to one another, wherein both the side of the component part facing the road and the side of the component part facing the LiDAR sensor/the camera were provided with the scratch resistant coating AS 4700 F. Examples nos. 27 to 31 are a combination of a coloured moulding, a transparent 2.3 mm-thick AG PC3 layer and a scratch resistant coating with AS 4700 F both on the side of the component part facing the road and on the side of the component part facing the LiDAR sensor/the camera.

The examples of example group 3 relate to combinations of the coloured film PC2 having the specified film thicknesses and a 3.2 mm-thick transparent PC4 film without any coating and with the scratch resistant coating AS 4700 F both on the side of the component part facing the road and on the side of the component part facing the LiDAR sensor/the camera.

Further experiments were performed with coloured polycarbonates containing IR absorbers. These are summarized in example group 4. The attenuation of the LiDAR laser was too strong, as a result of which these polycarbonates were not suitable for the uses according to the invention. The employed polycarbonate formulations are reported below the table for example group 4.

In the tables which follow, "both sides" is to be understood as meaning that both the side facing outwards and the side facing the LiDAR are coated.

Example Group 1 (*: Comparative Example)

| No. | Construction | LiDAR-side component | Road-side component | Coating | Thickness mm | Black panel | Dark/Dark | #Ty[%] (D65 10°) | T 400 to 900 | T 400 to 1000 | T 400 to 1100 | LiDAR signal based on air value in % |
|---|---|---|---|---|---|---|---|---|---|---|---|---|
| 1* | 1K | moulding 3 | none | none | 2.5 | + | ++ | 29 | 48 | 55 | 60 | — |
| 2 | 1K | moulding 1 | none | none | 2.5 | 0 | ++ | 24 | 46 | 53 | 58 | — |
| 3 | 1K | moulding 2 | none | none | 2.5 | 0 | ++ | 17 | 41 | 49 | 55 | — |
| 4 | 1K | moulding 4 | none | none | 2.5 | 0 | ++ | 15 | 40 | 48 | 54 | — |
| 5 | 1K | moulding 5 | none | none | 2.5 | − | 0 | 13 | 39 | 47 | 53 | — |
| 6 | 1K | moulding 6 | none | none | 2.5 | − | 0 | 7 | 35 | 44 | 51 | — |
| 7 | 1K | moulding 7 | none | none | 2.5 | − | 0 | 5 | 33 | 43 | 49 | — |
| 8* | 1K | moulding 8 | none | none | 2.5 | − | − | 2 | 30 | 40 | 47 | — |
| 9* | 1K | moulding 1 | none | none | 2.3 | ++ | ++ | 25 | 46 | 53 | 58 | 74 |
| 10 | 1K | moulding 2 | none | none | 2.3 | 0 | ++ | 20 | 42 | 50 | 56 | 70 |
| 11 | 1K | moulding 4 | none | none | 2.3 | 0 | ++ | 20 | 42 | 50 | 56 | 71 |
| 12 | 1K | moulding 7 | none | none | 2.3 | − | 0 | 7 | 33 | 42 | 49 | 70 |
| 13* | 1K | moulding 8 | none | none | 2.3 | − | − | 2 | 28 | 38 | 45 | 67 |
| 14* | 1K-B | moulding 1 | none | AS 4700 F both sides | 2.3 | ++ | ++ | 26 | 47 | 55 | 60 | 85 |
| 15 | 1K-B | moulding 2 | none | AS 4700 F both sides | 2.3 | 0 | ++ | 20 | 43 | 51 | 57 | 77 |
| 16 | 1K-B | moulding 4 | none | AS 4700 F both sides | 2.3 | 0 | ++ | 20 | 43 | 51 | 57 | 84 |
| 17 | 1K-B | moulding 7 | none | AS 4700 F both sides | 2.3 | − | 0 | 7 | 34 | 44 | 51 | 81 |
| 18* | 1K-B | moulding 8 | none | AS 4700 F both sides | 2.3 | − | − | 2 | 29 | 39 | 47 | 84 |

Example Group 2 (*: Comparative Example)

| No. | Construction | LiDAR-side component | Road-side component | Coating | Thickness mm | Black panel | Dark/Dark | #Ty[%] (D65 10°) | T 400 to 900 | T 400 to 1000 | T 400 to 1100 | LiDAR signal based on air value in % |
|---|---|---|---|---|---|---|---|---|---|---|---|---|
| 19* | 1K-D | moulding 1 | PC3 | none | 2.3 + 3.2 | ++ | ++ | 22 | 41 | 48 | 53 | 69 |
| 20 | 1K-D | moulding 2 | PC3 | none | 2.3 + 3.2 | 0 | ++ | 18 | 38 | 45 | 51 | 65 |
| 21 | 1K-D | moulding 4 | PC3 | none | 2.3 + 3.2 | − | ++ | 17 | 38 | 45 | 50 | 65 |
| 22 | 1K-D | moulding 7 | PC3 | none | 2.3 + 3.2 | − | 0 | 6 | 30 | 38 | 44 | 67 |
| 23* | 1K-D | moulding 8 | PC3 | none | 2.3 + 3.2 | − | − | 2 | 25 | 34 | 41 | 68 |
| 24 | 1K-D | moulding 1 | moulding 1 | AS 4700 F both sides | 2.3 + 2.3 | − | 0 | 7 | 32 | 40 | 46 | 74 |
| 25 | 1K-D | moulding 2 | moulding 2 | AS 4700 F both sides | 2.3 + 2.3 | − | 0 | 5 | 30 | 38 | 44 | 65 |
| 26 | 1K-D | moulding 4 | moulding 4 | AS 4700 F both sides | 2.3 + 2.3 | − | 0 | 4 | 29 | 38 | 44 | 68 |
| 27* | 1K + AG-B | moulding 1 | PC3 | AS 4700 F both sides | 2.3 + 3.2 | ++ | ++ | 24 | 44 | 51 | 56 | 73 |

| No. | Construction | LiDAR-side component | Road-side component | Coating | Thickness mm | Black panel | Dark/ Dark | #Ty[%] (D65 10°) | T 400 to 900 | T 400 to 1000 | T 400 to 1100 | LiDAR signal based on air value in % |
|---|---|---|---|---|---|---|---|---|---|---|---|---|
| 28 | 1K + AG-B | moulding 2 | PC3 | AS 4700 F both sides | 2.3 + 3.2 | 0 | ++ | 18 | 40 | 48 | 54 | 69 |
| 29 | 1K + AG-B | moulding 4 | PC3 | AS 4700 F both sides | 2.3 + 3.2 | 0 | ++ | 18 | 40 | 48 | 54 | 67 |
| 30 | 1K + AG-B | moulding 7 | PC3 | AS 4700 F both sides | 2.3 + 3.2 | − | 0 | 7 | 32 | 41 | 47 | 67 |
| 31* | 1K + AG-B | moulding 8 | PC3 | AS 4700 F both sides | 2.3 + 3.2 | − | − | 2 | 27 | 37 | 44 | 71 |

Example Group 3 (*: Comparative Example)

| No. | Construction | LiDAR-side component | Road-side component | Coating | Black panel | Dark/ Dark | #Ty[%] (D65 10°) | T 400 to 900 | T 400 to 1000 | T 400 to 1100 | LiDAR signal based on air value in % |
|---|---|---|---|---|---|---|---|---|---|---|---|
| 32* | 2K-F | PC2, 100 μm | PC 4 | AS 4700 F both sides | ++ | ++ | 32 | 61 | 67 | 70 | 85 |
| 33 | 2K-F | PC2, 175 μm | PC 4 | AS 4700 F both sides | 0 | ++ | 19 | 53 | 60 | 64 | 87 |
| 34 | 2K-F | PC2, 250 μm | PC 4 | AS 4700 F both sides | − | ++ | 9 | 46 | 54 | 59 | 86 |
| 35 | 2K-F | PC2, 375 μm | PC 4 | AS 4700 F both sides | − | ++ | 5 | 41 | 50 | 56 | 81 |
| 36 | 2K-F | PC2, 500 μm | PC 4 | AS 4700 F both sides | − | 0 | 2 | 37 | 47 | 53 | 85 |
| 37* | 2K-F | PC2, 100 μm | PC 4 | none | ++ | ++ | 37 | 60 | 65 | 69 | 78 |
| 38 | 2K-F | PC2, 175 μm | PC 4 | none | 0 | ++ | 18 | 50 | 57 | 62 | 78 |
| 39 | 2K-F | PC2, 250 μm | PC 4 | none | − | ++ | 9 | 44 | 52 | 57 | 77 |
| 40 | 2K-F | PC2, 375 μm | PC 4 | none | − | ++ | 5 | 41 | 49 | 55 | 77 |
| 41 | 2K-F | PC2, 500 μm | PC 4 | none | − | 0 | 2 | 36 | 45 | 51 | 81 |

Example Group 4 (*: Comparative Example)

| No. | Construction | LiDAR-side component | Coating | Black panel | Dark/ Dark | #Ty[%] (D65 10°) | T 400 to 900 | T 400 to 1000 | T 400 to 1100 | LiDAR signal based on air value in % |
|---|---|---|---|---|---|---|---|---|---|---|
| 42* | IK | PC-IR-1 | none | ++ | ++ | 26.84 | 39.38 | 44.15 | 47.79 | 42.38 |
| 43* | IK | PC-IR-2 | none | 0 | ++ | 22.7 | 41.34 | 46.48 | 50.36 | 44.9 |
| 45* | 1K-B | PC-IR-1 | AS 4700 F both sides | ++ | ++ | 27.67 | 40.36 | 45.3 | 49.07 | 47.5 |
| 47* | 1K-B | PC-IR-3 | AS 4700 F both sides | − | − | 5.44 | 3.01 | 2.6 | 2.31 | 1.52 |
| 48* | 1K-B | PC-IR-4 | AS 4700 F both sides | 0 | ++ | 21.11 | 30.16 | 33.77 | 36.72 | 25.5 |

In the IR absorber-containing polycarbonate formulations which follow, polycarbonate constitutes the difference to 100% by weight. Reported amounts are in each case based on the total weight of the composition.

PC-IR-1: Macrolex Red EG 0.004 wt %; Macrolex Violet 3R 0.001 wt %; Heliogen Blue K6911 0.0024 wt %; Black Pearls 800 (carbon black) 0.0011 wt %.

PC-IR-2: Oracet Yellow 180 0.0004 wt %; Macrolex Red EG 0.0045 wt %; Macrolex Green 5B 0.0046 wt %; Black Pearls 800 (carbon black) 0.0009 wt %.

PC-IR-3: LaB$_6$ (IR absorber; in acrylate matrix) 0.0135 wt %; Lumogen IR765 (IR-absorber; quaterylene structure) 0.0018 wt %; Macrolex Blue RR 0.0032 wt %; Macrolex Red EG 0.0031 wt %; Black Pearls 800 (carbon black) 0.0014 wt %.

PC-IR-4: Macrolex Red E2G 0.0015 wt %; Macrolex Violet B 0.0012 wt %; Heliogen Blue K6911 0.0010 wt %; Black Pearls 800 (carbon black) 0.0022 wt %.

The invention claimed is:

1. A sensor system comprising
a LiDAR unit having a transmitter for laser light having a wavelength of 800 nm to 1600 nm and a receiver for light having a wavelength of 800 nm to 1600 nm;
a camera for visible light having a wavelength of 380 nm to 780 nm and
a cover arranged such that IR light transmitted by the LiDAR unit and received thereby and visible light received by the camera passes through the cover, wherein the cover comprises a layer containing dyes, wherein
the cover has a light transmission Ty in the range from 380 to 780 nm of >3% to <25% determined according to DIN ISO 13468-2:2006 (D65, 10°),
the cover has a transmission for light in the range of 380 nm to 1100 nm of >40% determined according to DIN ISO 13468-2:2006 (D65, 10°), the cover attenuates the LiDAR signal only to the extent that the signal intensity of the IR light transmitted by the LiDAR unit and re-received thereby (determined by reflection from a smooth surface painted with TiO$_2$-containing white paint at a distance of 3.2 m) is >65% of a reference intensity determined without the cover and in that the layer containing dyes comprises a thermoplastic composition comprising the following components:

i) at least 70 wt % based on the total weight of the composition of a transparent thermoplastic polymer;

ii) at least one green and/or blue colourant;

iii) at least one red and/or violet colourant;

wherein the product of the sum of the weight percent fractions (based on the total weight of the composition) of the colourants ii) and iii) and the thickness of the layer containing dyes is >0.041 wt % mm to <0.12 wt % mm and wherein the composition contains 0 to <0.0005 wt % based on the total weight of the composition of infrared absorbers.

2. The system as claimed in claim 1, wherein the component ii) is selected from the group consisting of the formulae (1), (2a-c), (3), (4a), (4b), (5a), (5b), (6), (7), (8), and mixtures thereof and the component iii) is selected from the group consisting of the formulae (9), (10), (11), (12), (13), (14a), (14b), (15), and mixtures thereof:

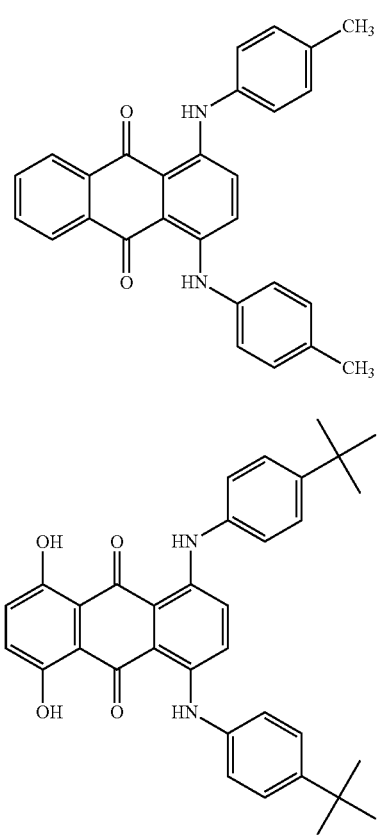

(1)

(2a)

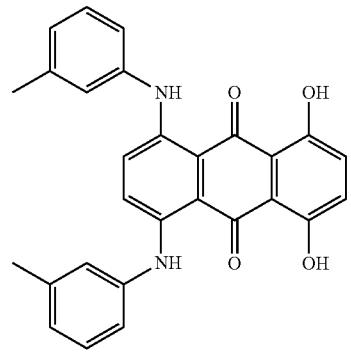

(2b)

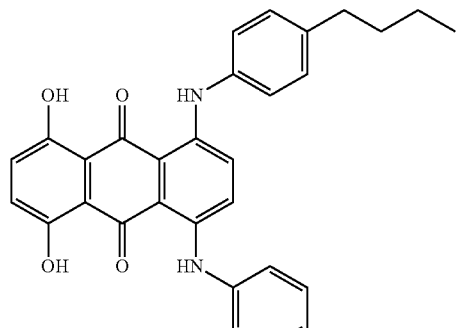

(2c)

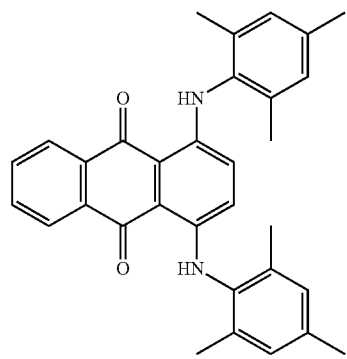

(3)

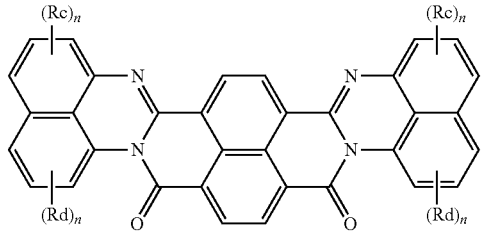

(4a)

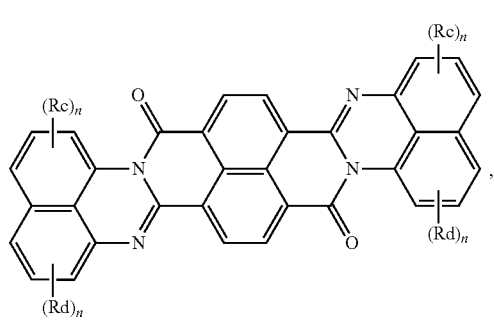

(4b)

wherein

Rc and Rd independently of one another represent a linear or branched alkyl radical or halogen, n independently of the respective Rc, Rd, Ra and Rb represents a natural number between 0 and 3

(5a)

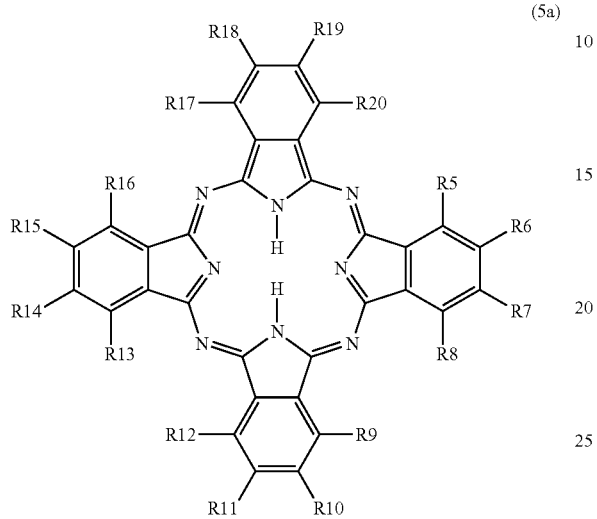

(5b)

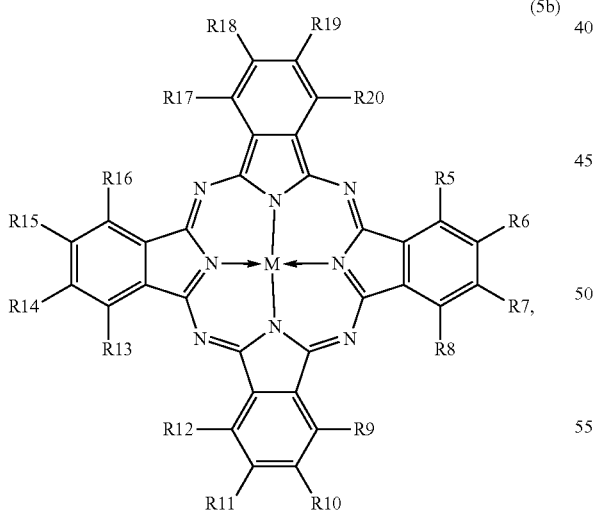

where the radicals R(5-20) independently of one another are selected from the group consisting of hydrogen, methyl, ethyl, propyl, isopropyl, butyl, isobutyl, tert-butyl, pentyl, neopentyl, hexyl, thexyl, fluoro, chloro, bromo, sulfone, CN, and M is selected from the group consisting of aluminum, nickel, cobalt, iron, zinc, copper, and manganese, (6)

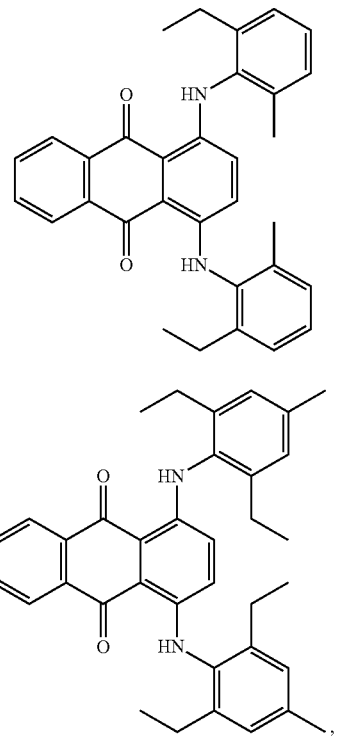

(7)

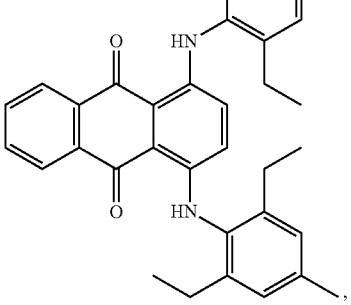

(8)

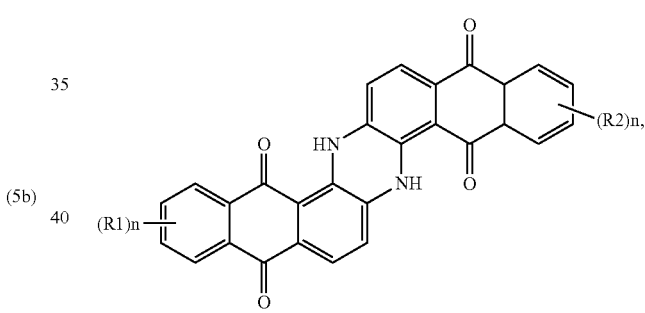

wherein

R1 and R2 independently of one another represent a linear or branched alkyl radical or halogen, n is a natural number between 0 and 4, (9)

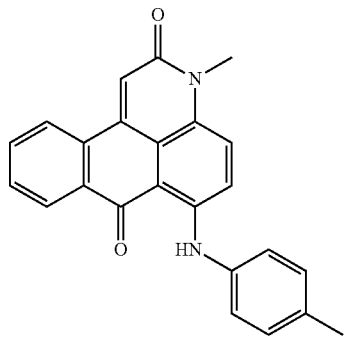

-continued

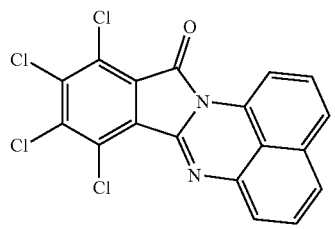
(10)

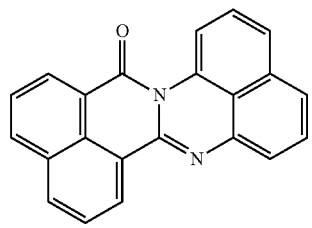
(11)

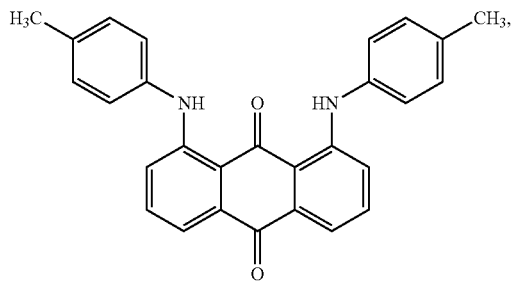
(12)

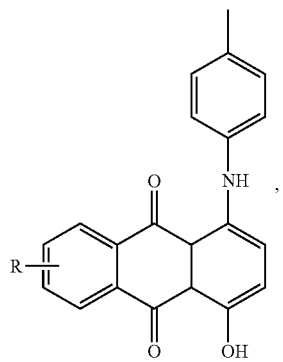
(13)

wherein R is selected from the group consisting of H and p-methylphenylamine radical,

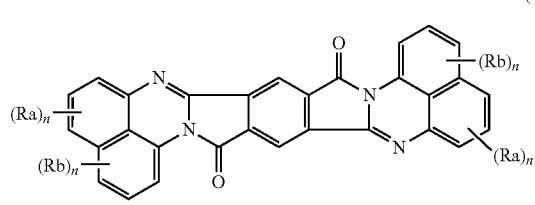
(14a)

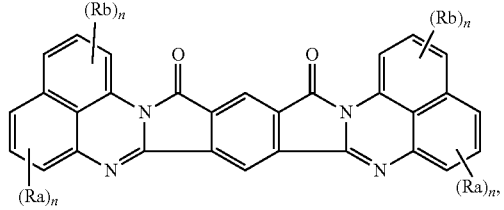
(14b)

wherein

Ra and Rb independently of one another represent a linear or branched alkyl radical or halogen, n independently of the respective Ra and Rb represents a natural number between 0 and 3,

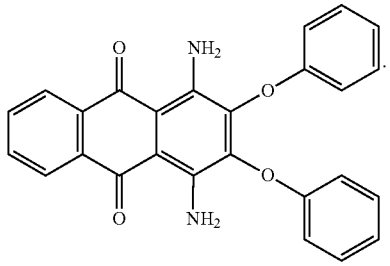
(15)

3. The system as claimed in claim 2, wherein the thermoplastic composition of the layer containing dyes comprises the following components:

at least 99 wt % based on the total weight of the composition of aromatic polycarbonate having a melt volume rate MVR of 15 to 20 cm³/(10 min) determined according to ISO 1133-1:2012-03 (300° C., 1.2 kg);

colourants of formula (2a), (2b) and/or (2c);

colourants of formula (5b) where M=Cu and R(5-20)=H;

colourants of formula (10);

wherein the sum of the colourants employed in total is ≥0.017 wt % to ≤0.057 wt % based on the total weight of the composition.

4. The system as claimed in claim 1, wherein the thermoplastic composition of the layer containing dyes comprises a yellow and/or orange-coloured dye of formulae (16), (17), (18), (19), (20) or a mixture of at least two thereof:

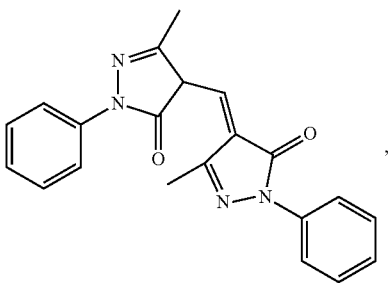
(16)

(17)

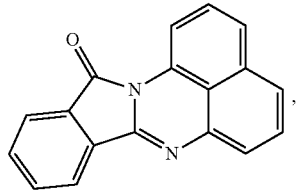

(18)

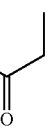 

(19)

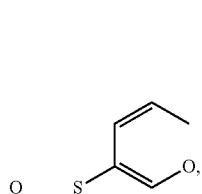

(20)

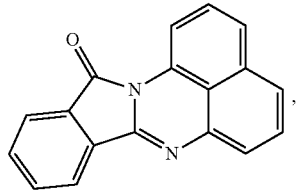

5. The system as claimed in claim 1, wherein the cover further comprises a layer of an aromatic polycarbonate which does not contain green, blue, red and/or violet colourants.

6. A vehicle comprising a system as claimed in claim 1.

7. The system as claimed in claim 6, wherein the topcoat layer contains an organomodified silane or a reaction product thereof.

8. The system as claimed in claim 6, wherein an adhesion promoter layer is present between the topcoat layer and the layer containing dyes.

9. The system as claimed in claim 6, wherein the topcoat used in the topcoat layer is a UV-curable topcoat.

10. The system as claimed in claim 6, wherein a further layer is present on the side of the layer containing dyes that is opposite the topcoat layer.

11. The system as claimed in claim 10, wherein the further layer is an antireflection layer, an anti-condensation layer, an anti-dust layer, a media resistance layer or a scratch resistance layer or a combination thereof.

12. The system as claimed in claim 1, wherein in the cover the layer containing dyes has a thickness of >0.15 mm to <5 mm.

13. The system as claimed in claim 1, wherein the cover comprises a plurality of layers containing dyes which may be identical or different.

14. The system as claimed in claim 1, wherein the cover further comprises a layer of an aromatic polycarbonate which does not contain green, blue, red and/or violet colourants.

15. A vehicle comprising a system as claimed in claim 1.

\* \* \* \* \*